May 2, 1939.     G. A. UNVERFERTH     2,157,038

SPACER AND SEAL FOR BUILDING CONSTRUCTION

Filed Dec. 6, 1937

INVENTOR
GERARD A. UNVERFERTH
BY
ATTORNEY

Patented May 2, 1939

2,157,038

UNITED STATES PATENT OFFICE 2,157,038

SPACER AND SEAL FOR BUILDING CONSTRUCTION

Gerard A. Unverferth, Dayton, Ohio

Application December 6, 1937, Serial No. 178,200

7 Claims. (Cl. 72—106)

This invention relates to an improved spacer and seal for cementing building blocks together and particularly glass building blocks.

The use of glass blocks or bricks for constructing walls of buildings is comparatively new. Craftsmen well versed in the art of laying sand, clay or concrete blocks, or bricks, when confronted with the problem of laying glass blocks or bricks have continued to use the ordinary mortar consisting of lime, sand and water. Among the many disadvantages and faults experienced by the use of this ordinary mortar in the laying of glass blocks or bricks the following are the most outstanding:

First, ordinary lime, sand and water mortar when set, will not adhere to the glass brick and therefore does not cement one brick to the other. The surface of the glass is smooth and substantially non-porous and no bond between this mortar and the glass brick is obtainable.

Second, due to the glass being substantially non-porous, the moisture of the mortar cannot be absorbed by the glass brick or block and therefore all of the moisture in the entire layer of mortar must be eliminated by evaporation solely. Naturally when such a moist layer is encased between two comparatively wide surfaces impervious to moisture the time required for complete evaporation is considerable. Applicant has discovered that only two rows of glass blocks or bricks may be laid without "squashing" or forcing the moist mortar out. After laying two superposed rows, the craftsman must allow two and a half to three and a half hours to elapse to permit the evaporation of moisture and "setting" of the mortar before another row of bricks or blocks of glass may safely be laid. This, of course, is an expense which, when added to the original cost of the glass blocks or bricks, prohibits their universal use especially by builders of just ordinary means.

Third, some craftsmen, desiring to rush construction work, will lay more than two rows of glass bricks. To do this they make the lowest layer of mortar initially thicker, depending upon the weight of the extra rows of blocks or bricks to "squash" or press out the extra mortar in the lower layers. This causes the mortar to run down over the lower rows of bricks or blocks and harden in the serrated outer faces of the bricks. Its removal from the serrated faces of the bricks is a tedious task which also adds to construction costs.

Fourth, the use of the ordinary lime, sand and water mortar will provide a separating seam between glass bricks or blocks which, when set, becomes brittle and non-yielding. The glass bricks, when subjected to heat, for instance the heat of the sun on a hot summer day, will expand considerably and, since the separating layers of cement are non-yielding, such expansion will cause buckling of the entire wall structure and general breakage. As the bricks cool, they will again contract to normal size, however, by this time the cement seal has been loosened or broken and now the wall will not only be leaky but will also be dangerously weakened.

It is among the objects of the present invention to eliminate these extra building costs by providing an improved spacer and seal which will immediately adhere to the contacting surface of the glass block or brick and which requires no time for "setting" as does the ordinary mortar. The spacer and seal of the present invention thus permits continuous and uninterrupted laying of glass blocks or bricks and consequently reduces building costs.

Another object of the present invention is to provide a spacer and seal that will not "squash" or be squeezed out from between the bricks due to the weight of the layers of superposed bricks. This entirely eliminates the added expense of removing mortar from the serrated outer surfaces of the bricks.

A still further object of the present invention is to provide an improved spacer and seal which requires nothing more of the craftsmen than the cutting of it into proper lengths, and then placing it into proper position upon the glass blocks or bricks, the device securely cementing together adjacent bricks, causing them to stick, one to the other, thus providing a sturdy and safe wall structure.

Another object of the present invention is to provide a spacer and seal for cementing glass blocks or bricks together, the size of the seal providing a niche between the adjacent bricks into which ordinary mortar may be placed and "pointed" to form a cement finish seam. The mortar, although not adherable to the glass bricks will, when set, stick to the adhesive edge of the spacer and seal and thus this finish strip of cement will be held in position.

And still another object of the present invention is to provide a spacer and seal adapted to adhere to the smooth surfaces of superposed glass bricks, said spacer and seal being of sufficient resiliency to compensate for relative movements between such glass bricks caused by their expansion and contraction due to varying temperatures.

Further objects and advantages will be apparent from the following description, reference being had to the accompanying drawing wherein a preferred embodiment of one form of the present invention is clearly illustrated.

Figure 1:
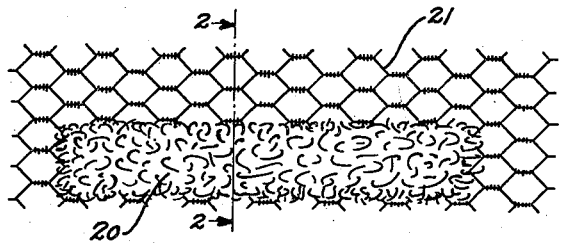
Fig. 1 illustrates two parts of the device as they are placed together in the first step of assembling the device.
Figure 2:
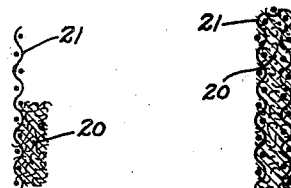
Fig. 2 is a section taken along the line 2—2 of Fig. 1.
Figure 5:
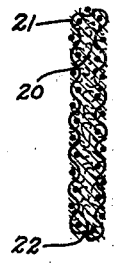
Fig. 5 is an enlarged sectional view similar to Fig. 4.

When making one of the improved spacer and sealing units, a piece of fibrous material such as cotton, wool, asbestos fibre, or any other similar material, preferably cotton, is formed into an elongated pad of substantially rectangular cross-sectional shape, as indicated by the numeral 20 in the drawing. The width of this fibrous pad must be slightly less than the width of the glass brick to which it is to be applied, however, it may be of any desired length. This fibrous pad is then placed upon a piece of wire screen 21, which is slightly more than twice as wide as the pad. Preferably this wire screen is of the type commonly known as "chicken wire" and of a coarse mesh. The wire is folded over the pad and in so doing the pad is compressed, then the two meeting edges of the screen are secured together as, for instance, by the twisting together of adjacent strands of wire as shown at 22 in Fig. 3 in which figure the wire screen is shown folded over the fibrous pad 20. The coarse mesh "chicken wire" screen is preferred inasmuch as it provides a retainer about the fibrous pad, which permits an extremely large area of the fibrous pad to be exposed for purposes to be explained later. Fig. 5 in conventional form, shows the sectional view of the assembly of Fig. 3.

Figure 3:
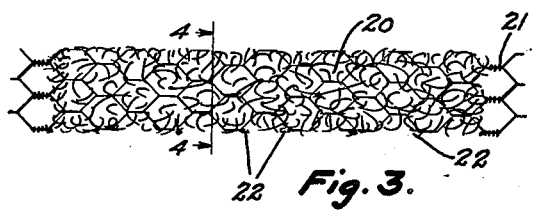
Fig. 3 illustrates the two parts of Fig. 1 completely assembled.
Figure 4:
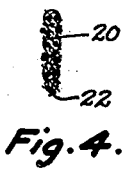
Fig. 4 is a section taken along the line 4—4 of Fig. 3.
Figure 7:
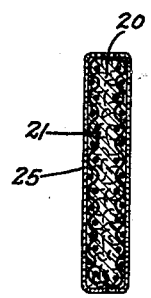
Fig. 7 is an enlarged section taken along the line 7—7 of Fig. 6.
Figure 6:
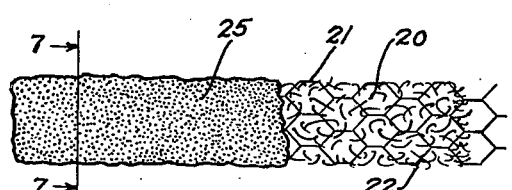
Fig. 6 is a fragmentary view of the spacer and seal, one-half being shown completely assembled, the other half substantially like the Fig. 3.

The structure of Fig. 3 provides the base or carrier for the plastic, adhesive cover or coating 25, which may be applied in any suitable manner. The material used to provide the coating 25 must be plastic so as to conform to any irregularities in the surface of the glass block and it must also be adhesive or sticky so as to cling to contacting surfaces of the glass blocks or bricks to cement them against relative movement. Bituminous compounds or products may be used, such as asphalt, tar and the like, gum arabic, soft shellac or any material having tenacious qualities and tending to remain in such a condition under substantially all circumstances. It has been found by experiment that tar is a very satisfactory ingredient to use for this coating process and it may be most satisfactorily applied by melting the tar, then dipping the assembled fibrous pad and its retainer into it, forming a comparatively thin coating of the tar about the pad, said coating readily adhering to the fibers of the pad and to the strands of wire comprising the retainer. Fig. 7 clearly illustrates this substantially thin coating 25 of adhesive material surrounding the assembled pad.

The fibrous core 20, having resilient characteristics, and coated with a substance which will stick to the smooth surfaces of the glass bricks, provides a spacer and seal adapted to compensate for expansion and contraction of the bricks due to changing temperatures. As the glass bricks expand the fibrous core will be compressed and when the glass bricks contract during cooling this core will again expand, thereby maintaining the adhesive coating in constant contact with the surface of the glass brick and consequently eliminating the possibilities of leaks and the weakening of the structure.

The finished spacer and seal strip is wrapped in waxed paper to permit handling for commercial use. The adhesive coating 25 will adhere slightly to the wrapper of waxed paper, but not sufficiently to render its removal difficult. The waxed paper, however, prevents sticking of one spacer and seal strip to another when they are stacked together for handling or shipping.

Figure 8:
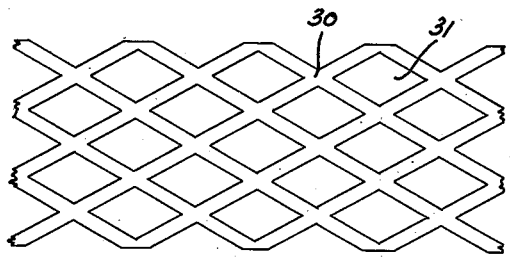
Fig. 8 is a view showing a section of the inside reinforcing member of the device.
Figure 9:
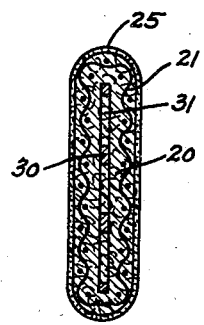
Fig. 9 is a section of the device including the inside reinforcing member.

In some constructive work a thicker seam or greater space between the glass blocks or bricks may be desirable. In that case the fibrous or cotton pad 20 is made thicker and in its interior a reinforcing member 30 is provided as shown in Figs. 8 and 9. This reinforcing member may be of any suitable flexible material which is preferably provided with apertures 31 to permit the fibrous material 20 to extend through the member as shown in Fig. 9. A strip of "chicken wire" considerably heavier and coarser than the "chicken wire" 21 forming the retainer about the outside of the fibrous core 20 may satisfactorily be used, however, in the drawing a strip of perforated, substantially heavy sheet metal is illustrated.

Figure 11:
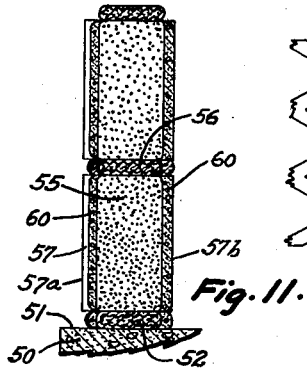
Fig. 11 is an enlarged part sectional view taken in the direction of the arrows 11—11 in Fig. 10, and showing the "cement" trim applied.
Figure 10:
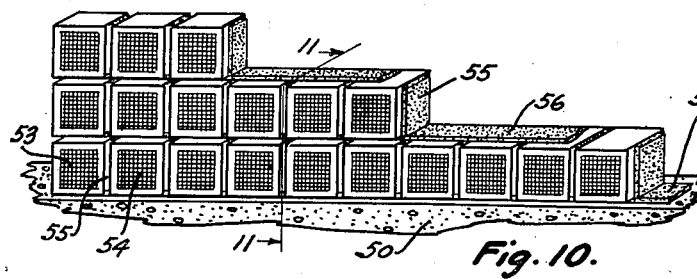
Fig. 10 is a perspective view, at reduced scale, showing the use of the improved spacer and seal with glass blocks or bricks. In this view the "cement" trim between bricks has not been shown.

Figs. 10 and 11 show the present invention as actually used in building construction. The concrete base or frame is designated by the numeral 50. The surface 51 of the base is brushed and cleaned to free it of loose grit or dirt. Then a spacer and seal strip 52 is placed in proper position on this surface 51, the adhesive coating of the strip causing it to adhere to this base. Now a glass brick or block 53 is placed in proper position upon the spacer and seal strip and here also the adhesive coating of the strip will adhere to the contacting surface of the glass brick and cement it in position. A piece of the spacer and seal strip 55 equal in length to the height of the glass brick is now placed against the side of the glass brick 53 following which another glass brick 54 is placed in position upon the base strip and in contact with the strip 55 on the side of the previously laid brick. These two bricks are now cemented together and upon the concrete base 50. The remaining bricks of the bottom row are laid in a similar manner. After the bottom row is completed, the second row of bricks is laid in a like manner, however, now the base spacer and seal strip 56 is laid in proper position upon the top surfaces of the bricks in the bottom row.

From this it is clearly perceptible that no wasteful waiting by the craftsman for "setting" or drying of the cementing joint or seam is necessary. On the contrary the operation of the laying of bricks may continue uninterruptedly. This naturally eliminates the necessity of the craftsman to charge his time for wasteful waiting and thus substantially reduces the costs of construction work and also reduces the time necessary for its completion.

As has been stated in an aforegoing paragraph, the width of the finished spacer and sealing strip is narrower than the width of the glass brick to which it is applied. This is clearly shown in the Fig. 11 in which the strip 52 has its ends terminating short of the front and back surfaces 57a and 57b respectively of the brick 57. As a consequence, pockets are provided between adjacent bricks into which the ordinary lime, sand and water mortar 60 may be applied, then "pointed" to provide a smooth finish. This mortar, engaging the sticky edges of the spacer and seal strips will adhere and be cemented thereto and thus this strip of mortar will be held securely in position even though it does not adhere to the surfaces of the glass bricks. By this process all the benefits of ordinary cement, as far as outer appearances is concerned, are available, while on the other hand the disadvantages of its complete use, such as weak construction, no actual cementing together of the glass bricks and the necessity of lost time by waiting for "setting" or hardening are entirely eliminated. Putty or any other plastic may be used to fill the pockets or niches between the bricks.

Inasmuch as many modifications could be made in the construction of this device without departing from the scope of the invention as defined in the claims following, still it is intended that all matter included in the aforegoing description or illustrated by the accompanying drawing shall be interpreted as illustrative only and not in a limiting sense.

I claim:

1. A spacer and seal for cementing building blocks together, comprising a flexible and compressible core; a bail about said core for confining it; and a covering of plastic and adhesive material about said bail and core, adapted to adhere to the core and bail and adapted sealingly to engage contacting surfaces of building blocks.

2. A spacer and seal for cementing building blocks together, comprising a compressible fibrous core; an apertured reinforcing and retaining member completely about said core; and a covering of plastic and adhesive material about said core and member, adhering thereto and adapted to adhere to the surfaces of building blocks between which said space and seal is adapted to be placed.

3. A spacer and seal for cementing building blocks together, comprising, a fibrous center strip; a flexible retainer completely about said fibrous strip, said retainer having comparatively large apertures exposing areas of the fibrous strip; and a covering of adhesive bituminous material about said retainer, adhering thereto and to the exposed areas of the fibrous strip and adapted also to adhere to contacting surfaces of the building blocks.

4. A spacer and seal for cementing building blocks together, comprising, a resilient fibrous center strip; a wire screen retainer completely about said strip; and a covering of plastic and adhesive material around the strip and retainer, adhering thereto and adapted to adhere to contacting surfaces of the building blocks.

5. A spacer and seal for cementing glass building blocks together, comprising a resilient, fibrous strip; a mesh retainer about said strip a flexible reinforcing member within said strip; and a coating of plastic and adhesive material about said strip, adhering thereto and adapted to adhere to contacting surfaces of the glass building blocks.

6. A spacer and seal for cementing glass building blocks together, comprising a resilient, fibrous strip; a perforated, flexible reinforcing member within said strip; a wire screen retainer completely about the fibrous strip; and a surface coating of plastic and adhesive material about said fibrous strip and retainer, adhering thereto and adapted to adhere to contacting surfaces of the glass building blocks.

7. A spacer and seal for cementing glass building blocks together, comprising an elongated cotton pad; a perforated metal reinforcing member within said cotton pad; a comparatively coarse mesh, wire screen retainer completely about said cotton pad; and a surface coating of an adhesive bituminous material about said pad and its retainer, adhering thereto and adapted to adhere to contacting surfaces of the glass building blocks.

GERARD A. UNVERFERTH.